United States Patent
Robison

(10) Patent No.: US 9,760,410 B2
(45) Date of Patent: Sep. 12, 2017

(54) TECHNOLOGIES FOR FAST SYNCHRONIZATION BARRIERS FOR MANY-CORE PROCESSING

(71) Applicant: Intel Corporation, Santa Clara, CA (US)

(72) Inventor: Arch D. Robison, Champaign, IL (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/568,890

(22) Filed: Dec. 12, 2014

(65) Prior Publication Data

US 2016/0170813 A1 Jun. 16, 2016

(51) Int. Cl.
G06F 9/46 (2006.01)
G06F 9/52 (2006.01)

(52) U.S. Cl.
CPC .................... G06F 9/522 (2013.01)

(58) Field of Classification Search
CPC ....................................................... G06F 9/542
See application file for complete search history.

(56) References Cited

U.S. PATENT DOCUMENTS

| | | | | |
|---|---|---|---|---|
| 2006/0143361 A1* | 6/2006 | Kottapalli | ................. | G06F 9/52 711/100 |
| 2006/0212868 A1* | 9/2006 | Takayama | ................. | G06F 9/52 718/100 |
| 2011/0078417 A1* | 3/2011 | Fahs | ................... | G06F 9/30145 712/216 |
| 2012/0203881 A1* | 8/2012 | Suto | .................... | H04L 41/0823 709/223 |
| 2014/0164736 A1* | 6/2014 | Rozas | .................... | G06F 15/78 712/43 |

* cited by examiner

Primary Examiner — Lewis A Bullock, Jr.
Assistant Examiner — Melissa Alfred
(74) Attorney, Agent, or Firm — Barnes & Thornburg LLP

(57) ABSTRACT

Technologies for multithreaded synchronization including a computing device having a many-core processor. Each processor core includes multiple hardware threads. A hardware thread executed by a processor core enters a synchronization barrier and synchronizes with other hardware threads executed by the same processor core. After synchronization, the hardware thread synchronizes with a source hardware thread that may be executed by a different processor core. The source hardware thread may be assigned using an n-way shuffle of all hardware threads, where n is the number of hardware threads per processor core. The hardware thread resynchronizes with the other hardware threads executed by the same processor core. The hardware thread alternately synchronizes with the source hardware thread and the other hardware threads executed by the same processor core until all hardware threads have synchronized. The computing device may reduce a Boolean value over the synchronization barrier. Other embodiments are described and claimed.

17 Claims, 8 Drawing Sheets

```
__declspec(align(64))
struct LocalCacheLine {      // Shared by threads on a core
    union {
        volatile char c[4];  // One slot per subcore
        volatile int i;
    } sense[15];             // Includes extra padding
    char ticket [4] ;        // One ticket counter per subcore
};

LocalCacheLine localArray[N_CORES];    // 208'

__declspec(align(64))
struct GlobalCacheLine {     // Shared between two cores
    atomic_byte flag[2][4];  // Includes extra padding
    char pad[64-2*4];
};

GlobalCacheLine globalArray[N];    // 212' struct Network {
    int subcore;    // value between 0 and 3
    int core;       // value between 0 and N/4-1
    int srcID;      // id of the thread from which thread k
                    // reads
};

Network Net[N];    // 216'
```

FIG. 5A

```
int barrier(int flag) {                   ⎛— 302', 304'
    int id = get_thread_id();
    int subcore = Net[id].subcore;

// Get ticket number.
    volatile LocalCacheLine* local = &local[Net[id].core];
    int j = (1 + ++local->ticket[subcore]) & 0xFF;
306'
  ⎩ // Get ends of intra-core channel. The "j&1" causes
    // invocations of wait() to alternate between two channels.
    atomic_byte* dstFlag = globalArray[id].flag[j&1];
    atomic_byte* srcFlag = globalArray[Net[i].srcID].flag[j&1];

// Low bit also tells us sense of core-local barrier.
    // Low bit of each byte will be used to disseminate flag.
    int sense = j&1 ? 0 : ~0x01010101;

// Done with low bit.
314'  j &= ~1;
                                      ⎛— 352'
  ⎩ for (int level = 0; ; ++level) {
        // Begin radix-4 core-local barrier.
        local->sense[level].c[subcore] = sense | flag;  316', 318' int i;
        while (((i=local->sense[level].i)^sense) & ~0x01010101)
            PAUSE();    322'                            ⎩— 320'

// Gather flags from subcores
        if ( i & 0x01010101 )   324'
            flag = 1;

// Reached the end of the network?  326', 328'
        if ( level == N_LEVEL )
            break;

… # TECHNOLOGIES FOR FAST SYNCHRONIZATION BARRIERS FOR MANY-CORE PROCESSING

BACKGROUND

For current computing devices and applications, efficient multithreaded performance is becoming increasingly important. OpenMP is a popular application programming interface (API) for shared-memory parallel programming. OpenMP specifies a synchronization barrier feature, which may be used to coordinate multiple threads executing in a thread team. In general, all threads of the thread team must reach the barrier before execution of the program may proceed. OpenMP also specifies a tasking system, in which threads may create and execute tasks. All tasks must be completed before the threads may exit a synchronization barrier. Thus, tasks are often executed while threads are waiting in synchronization barriers.

Synchronization barriers are typically implemented by having threads wait on each other in some pattern. For example, in a tree barrier, the threads wait on each other in a tree pattern, starting from the leaves and fanning in up to the root, and then in reverse, fanning out from the root down towards the leaves. As another example, in a hierarchical barrier, the threads also wait on each other in a tree pattern, but threads executed by the same processor core are grouped as leaf nodes that are near each other in the tree. As a third example, in a dissemination barrier, the threads wait on each other in a more complicated pattern that essentially forms a group of overlapping trees. In a cache-based processor architecture, the time required to complete a barrier operation may be dominated or otherwise limited by the number of cache misses incurred by each thread as the thread communicates with other threads to cross the synchronization barrier.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 5A-5C are pseudocode illustrating at least one embodiment of the method for fast multithreaded synchronization of that may be executed by the computing device of FIGS. 1 and 2.

DETAILED DESCRIPTION OF THE DRAWINGS

Figure 1:
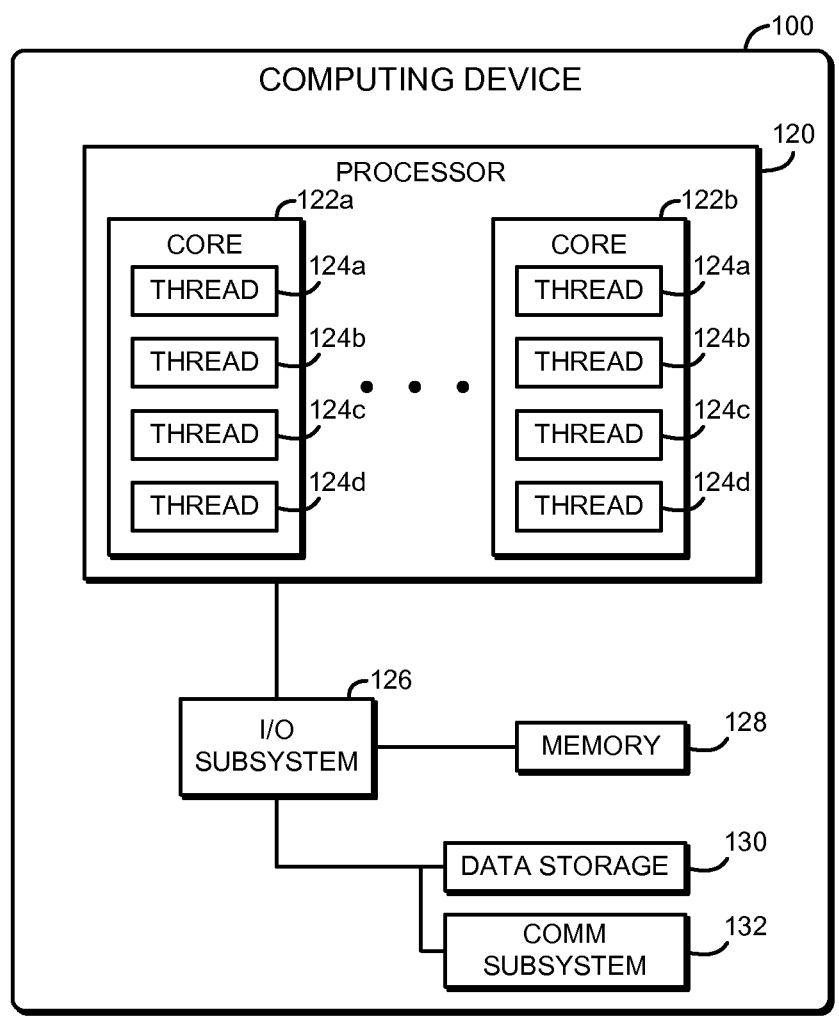
FIG. 1 is a simplified block diagram of at least one embodiment of a computing device for fast multithreaded synchronization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for fast multithreaded synchronization includes a processor 120, an I/O subsystem 126, a memory 128, and a data storage device 130. In use, as discussed in more detail below, the computing device 100 is configured to execute many tasks concurrently using hardware resources of the processor 120 such as hardware threads and/or processor subcores. After a thread enters a synchronization barrier, the thread performs local synchronization with the other threads executing on the same processor core. Local synchronization on the same processor core may occur quickly, for example using a private cache of the processor core. After local synchronization, each thread performs remote synchronization with a source thread that may be executed by a different processor core of the processor 120. The source threads are assigned according to an n-way perfect shuffle configuration, where n is the number of hardware threads of each processor core. After remote synchronization, each thread again performs local synchronization with the other threads executed by the same processor core. The computing device 100 continues alternating between remote synchronization and local synchronization until all of the threads have synchronized.

By alternating remote synchronization and local synchronization, the computing device 100 may reduce the number of cache misses incurred during execution of the synchronization barrier. Additionally, the computing device 100 may incur cache misses for several threads in parallel, which may improve performance and reduce overall latency. The computing device 100 may provide those performance improvements for all levels of the synchronization barrier (i.e. for each iteration of the remote synchronization and local synchronization). For certain embodiments of the computing device 100 tested using an Intel® Xeon Phi™ coprocessor, synchronization barrier performance may be almost twice as fast as conventional tree barriers. By including support for a reduce-all OR over a Boolean flag parameter, the computing device 100 may support implementation of transactional synchronization barriers compatible with OpenMP tasking semantics, as further described in the co-pending U.S. patent application Ser. No. 14/568,831, entitled "Technologies for Efficient Synchronization Barriers with Work Stealing Support."

The computing device 100 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the computing device 100 illustratively includes the processor 120, the input/output subsystem 126, the memory 128, and the data storage device 130. Of course, the computing device 100 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of multi-core processor capable of performing the functions described herein. For example, the processor 120 may be embodied as a multi-core processor(s), many-core processor(s), coprocessor(s), digital signal processor, microcontroller, or other processor or processing/controlling circuit. The processor 120 includes two or more processor cores 122, each of which is an independent processing unit capable of executing programmed instructions. Each processor core 122 may include or be coupled with a dedicated private cache memory. The illustrative processor 120 includes two processor cores 122a and 122b; in some embodiments the processor 120 may include many more processor cores 122 (e.g., 57 processor cores 122, 60 processor cores 122, 61 processor cores 122, or more processor cores 122). Each processor core 122 includes two or more hardware threads 124; in the illustrative embodiment, each processor core 122 includes four hardware threads 124. Each hardware thread 124 may be embodied as any logical processor, subcore, hardware thread, or other execution resource capable of executing programmed instructions. Thus, in an embodiment of a processor 120 having 60 processor cores 122 with four hardware threads 124 each, the processor 120 may include 240 total hardware threads 124. Each hardware thread 124 of a processor core 122 may share the same private cache. Additionally, although the illustrative computing device 100 includes a single many-core processor 120, the technologies disclosed herein are also applicable to a computing device 100 having two or more processors 120 (for example, a server processor coupled to a many-core coprocessor).

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip. The data storage device 130 may be embodied as any type of device or devices configured for short-term or long-term storage of data such as, for example, memory devices and circuits, memory cards, hard disk drives, solid-state drives, or other data storage devices.

The computing device 100 may also include a communication subsystem 132, which may be embodied as any communication circuit, device, or collection thereof, capable of enabling communications between the computing device 100 and other remote devices over a computer network (not shown). The communication subsystem 132 may be configured to use any one or more communication technology (e.g., wired or wireless communications) and associated protocols (e.g., Ethernet, Bluetooth®, Wi-Fi®, WiMAX, etc.) to effect such communication.

Figure 2:
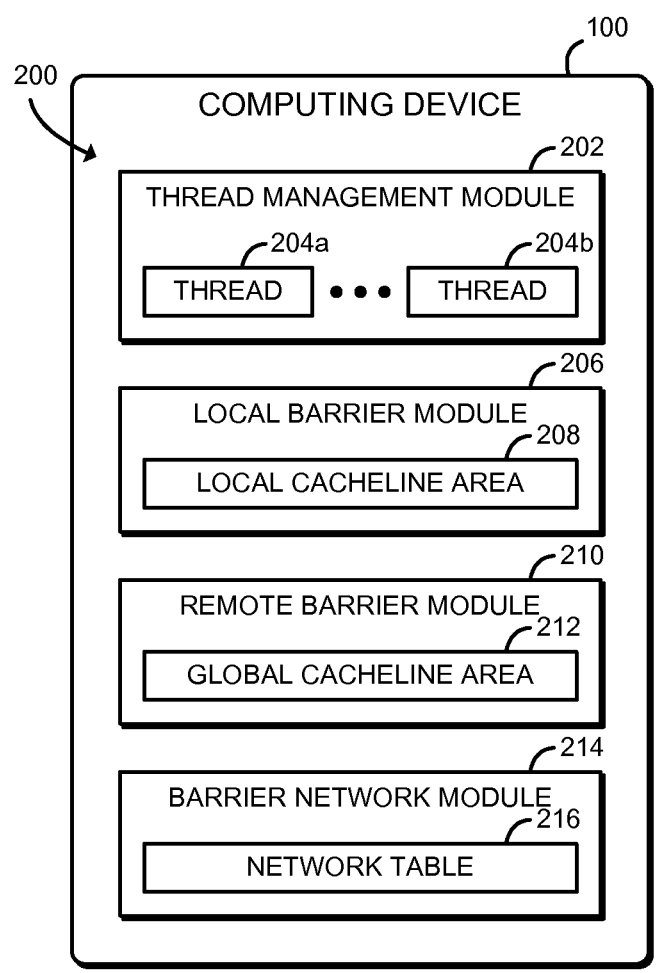
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a thread management module 202, a local barrier module 206, a remote barrier module 210, and a barrier network module 214. The various modules of the environment 200 may be embodied as hardware, firmware, software, or a combination thereof. For example, each of the modules, logic, and other components of the environment 200 may form a portion of, or otherwise be established by, the processor 120 or other hardware components of the computing device 100. As such, in some embodiments, one or more of the modules of the environment 200 may be embodied as a circuit or collection of electrical devices (e.g., a thread management circuit, a local barrier circuit, a remote barrier circuit, etc.).

The thread management module 202 is configured to create, execute, and otherwise manage one or more threads 204. Each of the threads 204 may be embodied as an operating system thread, managed executable thread, application thread, worker thread, lightweight thread, or other program capable of being executed by a hardware thread 124. Each of the threads 204 may be pinned or otherwise bound to execute on one of the hardware threads 124. Thus, although illustrated as including two threads 204a, 204b, the environment 200 may include many more threads 204 (e.g., one thread 204 for each hardware thread 124). The thread management module 202 is further configured to manage thread synchronization by causing the threads 204 to enter a synchronization barrier and to manage execution of the synchronization barrier.

The local barrier module 206 is configured to synchronize a first group of threads 204 executed by a single processor core 122. Local synchronization may be completed quickly, with minimal latency. The local barrier module 206 may maintain a memory structure for each processor core 122 that is used for intra-core communications. The memory structure may be embodied as an array of structures maintained in a local cache line area 208. The memory structure for each processor core 122 may fit within a single memory cache line addressable by the processor 120.

The remote barrier module 210 is configured to synchronize a thread 204a executing on one processor core 122 with a source thread 204b that may be executing on another processor core 122. Remote synchronization may incur one or more cache misses and thus may incur latency. The remote barrier module 210 may maintain a memory structure for each thread 204 that is used for inter-core communications. The memory structure may be embodied as an array of structures maintained in a global cache line area 212. The memory structure for each thread 204 may fit within a single memory cache line addressable by the processor 120. The remote barrier module 210 may also be configured to synchronize threads 204 executing on the same processor core 122.

The barrier network module 214 is configured to establish a network of connections between the threads 204 executing on different processor cores 122, to allow for synchronization of all threads 204. The barrier network module 214 may establish an n-way shuffle for the threads 204, where n is the number of hardware threads 124 for each processor core 122 (e.g., a 4-way shuffle for four hardware threads 124 per processor core 122). The relationships between the hardware threads 124 may be predefined in a network table 216. For example, the network table 216 may identify a source thread 204b for each thread 204a.

The thread management module 202 is further configured to alternatively repeat synchronization with the remote barrier module 210 and then the local barrier module 206 until all of the threads 204 are synchronized. For example, for a processor 120 having 60 processor cores 122 and four hardware threads 124 each (for 240 total threads 204), the thread management module 202 may alternatively repeat remote synchronization and then local synchronization four times.

Figure 3A:
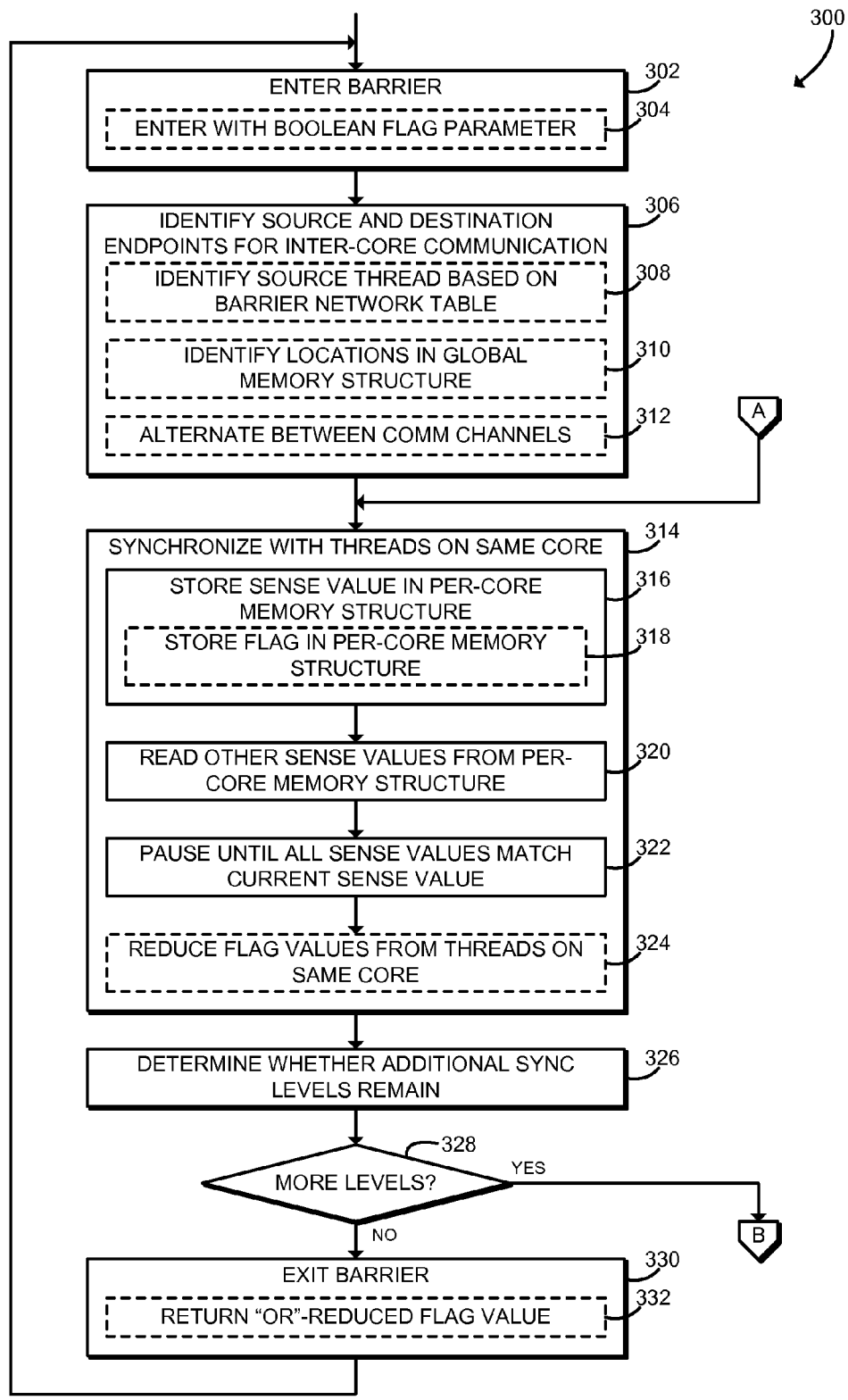
FIGS. 3A and 3B are a simplified flow diagram of at least one embodiment of a method for fast multithreaded synchronization that may be executed by the computing device of FIGS. 1 and 2.

Referring now to FIG. 3A, in use, the computing device 100 may execute a method 300 for fast multithreaded synchronization. The method 300 may be executed by a hardware thread 124 of the computing device 100, for example by executing a thread 204a that has been pinned to a hardware thread 124a. Thus, multiple instances of the method 300 may be executed concurrently by the hardware threads 124 of the processor 120. The method 300 begins in block 302, in which a hardware thread 124a of the computing device 100 enters a synchronization barrier. The hardware thread 124a may enter the synchronization barrier in response to a hardware instruction, function call, system call, trap, or other event processed by the hardware thread 124a. In some embodiments, in block 304 the hardware thread 124a may enter the synchronization barrier with a Boolean flag parameter. The flag parameter may be provided by a user or by a multithreading framework. As further described below, the computing device 100 may perform a logical-OR reduction of the Boolean flag values of multiple hardware threads 124 during execution of the synchronization barrier. This capability may support implementation of transactional synchronization barriers compatible with OpenMP tasking semantics, as further described in the co-pending U.S. patent application Ser No. 14/568,831, entitled "Technologies for Efficient Synchronization Barriers with Work Stealing Support."

In block 306, the hardware thread 124a identifies source and destination endpoints for inter-core communication. The source and destination endpoints may be embodied as any memory location or other communication channel capable of communicating data between the hardware thread 124a (the "destination" hardware thread 124a) and another hardware thread 124b that may be executed by a different processor core 122 (the "source" hardware thread 124b). Additionally, as described further below, in some embodiments, the source and/or destination endpoints may include multiple memory locations or communication channels associated with different levels in the barrier network. In some embodiments, in block 308, the computing device 100 may identify the source hardware thread 124b using the predefined barrier network table 216. In the illustrative embodiment with four hardware threads 124 per processor core 122, the assignments of source hardware threads 124 may form a 4-way perfect shuffle of all of the hardware threads 124 of the processor 120. For example, in some embodiments the processor 120 may execute N threads 204 (e.g., 240 threads), and each thread 204 may be identified by an integer thread ID number from zero to N−1 (e.g., 0 to 239). Each of the N threads 204 may be pinned or otherwise execute on one of the hardware threads 124, and thus may be identified by the associated processor core 122 and hardware thread 124. Each hardware thread 124 may be identified by a subcore identifier from zero to three, and each processor core 122 may be identified by an integer core ID number from zero to N/4−1 (e.g., 0 to 59). In that example, the source thread ID j for a destination thread ID k may be determined using Equation 1, below. The barrier network table 216 may be populated with the results of the Equation 1. Thus, in the illustrative embodiment, each hardware thread 124 may index the barrier network table 216 using its own thread ID to determine the thread ID of its assigned source hardware thread 124.

$$j = \left\lfloor \frac{N}{4} \right\rfloor \cdot subcore_k + core_k \tag{1}$$

Figure 4:
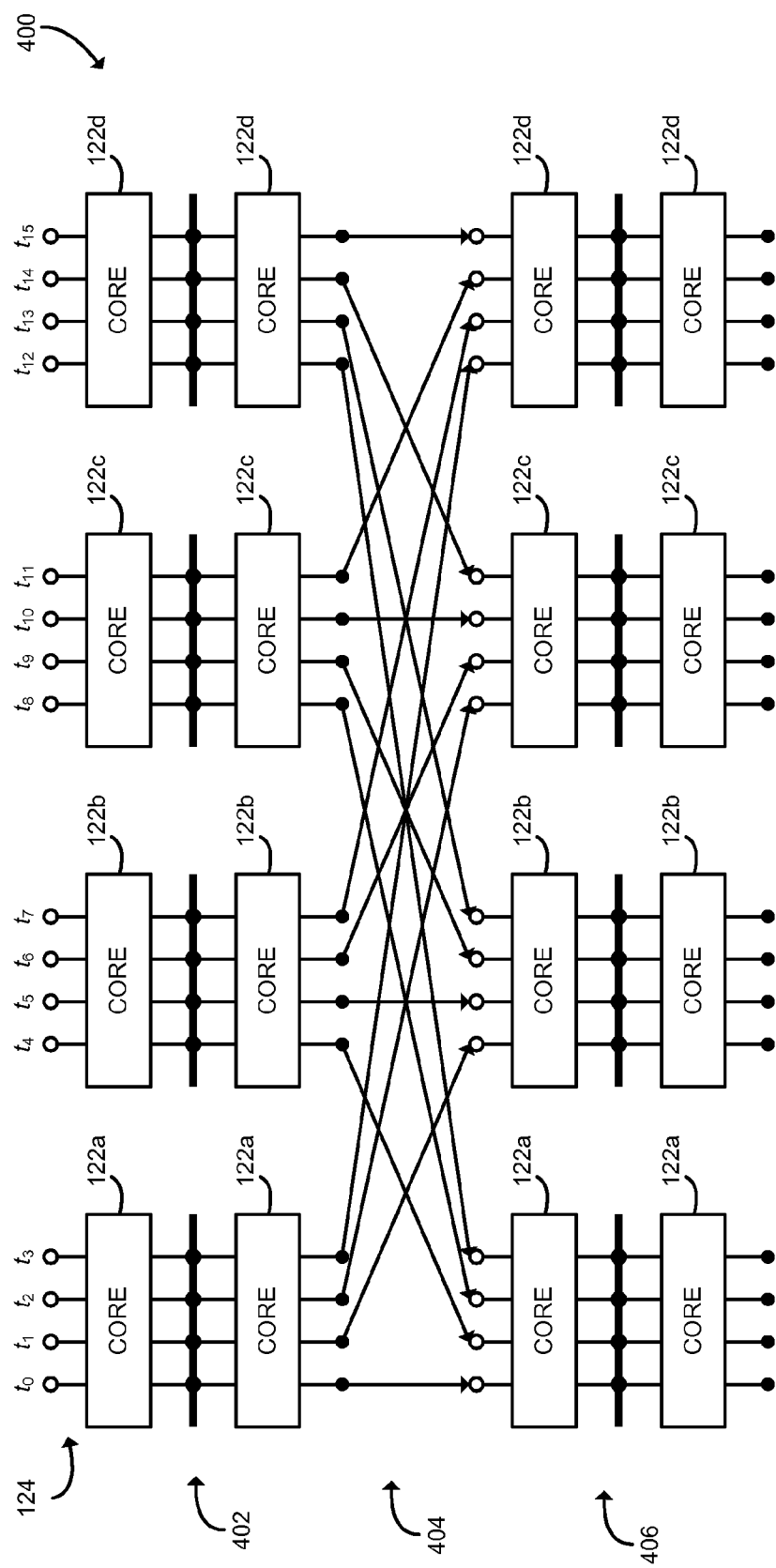
FIG. 4 is a schematic diagram illustrating a barrier communication network that may be established by the computing device of FIGS. 1 and 2.

For example, referring now to FIG. 4, the schematic diagram 400 illustrates one potential embodiment of the barrier network for 16 hardware threads 124, illustrated as threads $t_0$ through $t_{15}$ (having corresponding thread IDs 0 to 15). In a local synchronization 402, the threads $t_0$ through $t_{15}$ synchronize locally with threads t on the same processor core 122, as described further below. In a remote synchronization 404, the threads $t_0$ through $t_{15}$ may synchronize with source threads executing on different processor cores 122, using the perfect-shuffle network topology described in the barrier network table 216. For example, the thread $t_0$ has a subcore number of 0 and a core number of 0. Thus, the source thread ID for $t_0$ is 0; that is, the source thread for $t_0$ is $t_0$, meaning the thread $t_0$ synchronizes with itself. The thread $t_1$ has a subcore number of 1 and a core number of 0.

Thus, the source thread ID for $t_1$ is 4, meaning the source thread for $t_1$ is $t_4$. As another example, the thread $t_4$ has a subcore number of 0 and a core number of 1. Thus, the source thread ID for $t_4$ is 1, meaning the source thread for $t_4$ is $t_1$. The source thread may be determined similarly for the remaining threads.

Although illustrated as a 4-way perfect shuffle, it should be understood that the barrier network table 216 may describe different topologies. For example, the barrier network table 216 may describe an n-way perfect shuffle, where n is the number of hardware threads 124 for each processor core 122. Additionally, topologies other than perfect shuffle may be used. However, the perfect shuffle topology may use the same source hardware thread 124 for each synchronization level; other topologies may require assigning or otherwise determining a different source hardware thread 124 for each synchronization level.

Referring back to FIG. 3A, in some embodiments, in block 310 the hardware thread 124a may identify the source and destination endpoints as locations in a global memory structure. For example, the source and destination endpoints may point to locations in the system memory 128, such as locations in the global cache line area 212. Each hardware thread 124 executed by the computing device 100 may be associated with a particular endpoint in the memory 128. The hardware thread 124a may identify the destination endpoint as the endpoint associated with the current hardware thread 124a, and may identify the source endpoint as the endpoint associated with the source hardware thread 124b.

In some embodiments, in block 312 the hardware thread 124a may alternate between two different communication channels after every invocation of the synchronization barrier. For example, the global memory structure may include two endpoints associated with each hardware thread 124, and the hardware thread 124a may alternate between those endpoints every time the synchronization barrier is entered. Including two communication channels may allow the computing device 100 to perform logical-OR reduction during execution of the synchronization barrier.

In block 314, the hardware thread 124a synchronizes with hardware threads 124 executing on the same processor core 122. The hardware thread 124a may perform the synchronization by, for example, reading from and/or writing to a per-core memory structure shared with the other hardware threads 124 of the processor core 122, which may be stored in the private cache of the processor core 122. For example, in some embodiments the hardware thread 124a may write to a memory structure stored in the local cache line area 208. Thus, the hardware thread 124a may perform the synchronization without a cache miss to the system memory 128 and without the associated cache miss latency.

In block 316, the hardware thread 124a stores a sense value in the per-core memory structure. The sense value may be embodied as any value that alternates every time the hardware thread 124a enters the synchronization barrier (e.g., odd/even, 1/0, etc.). In some embodiments, in block 318 the hardware thread 124a may store the Boolean flag parameter in the per-core memory structure. For example, the hardware thread 124a may encode the Boolean flag parameter in one bit of the per-core memory structure.

In block 320, the hardware thread 124a reads other sense values from the per-core memory structure. The other sense values have been or will be written by the other hardware threads 124 executed by the processor core 122. In block 322, the hardware thread 124a pauses until all of the sense values written by the other hardware threads 124 match the sense value stored by the hardware thread 124a as described above in block 316. In other words, the hardware thread 124a waits until all of the hardware threads 124 of the processor core 122 have written the same sense value to the per-core memory structure. The hardware thread 124a may busy-wait, spin, yield, sleep, or perform any other appropriate technique to pause execution.

In block 324, in some embodiments the hardware thread 124a may reduce flag parameter values received from the hardware threads 124 of the same processor core 122 to a single flag parameter value. In some embodiments, the hardware thread 124a may recover a flag parameter value from each of the sense values stored by the hardware threads 124, for example by determining a bit value from each of the sense values. The hardware thread 124a may reduce those flag parameter values by performing a logical OR operation to determine a reduction value.

In block 326, after synchronizing with the hardware threads 124 executed by the same processor core 122, the hardware thread 124a determines whether additional synchronization levels remain to complete synchronization. The number of synchronization levels may describe the number of times to perform local synchronization with the hardware threads 124 executed by the same processor core 122. The number of synchronization levels N_level may be determined as the ceiling (smallest integer not less than) of the base-n logarithm of the total number of threads N executed by the computing device 100, where n is the number of hardware threads 124 per processor core 122. N_level may be determined using Equation 2, below. For example, in an embodiment having four hardware threads 124 per processor core 122 and having 240 total threads 204, N_level=$\lceil \log_4 240 \rceil$=4 levels. As another example, as shown in FIG. 4, in an embodiment having four hardware threads 124 per processor core 122 and having 16 total threads 204, N_level=$\lceil \log_4 16 \rceil$=2 levels. As shown in the schematic diagram 400 of FIG. 4, the synchronization barrier includes the local synchronization 402, the remote synchronization 404, and another local synchronization 406, corresponding to an N_level equal to two.

$$N\_level = \lceil \log_n N \rceil \quad (2)$$

Referring back to FIG. 3A, in block 328, the hardware thread 124a determines whether additional synchronization levels remain. If so, the method 300 branches to block 334, shown in FIG. 3B, to perform remote synchronization as described below. If no additional synchronization levels remain, the method 300 advances to block 330.

In block 330, the hardware thread 124a exits the synchronization barrier. In some embodiments, in block 332, the hardware thread 124a may return the logical OR reduced flag parameter value, called the reduction value. The reduction value may support implementation of transactional synchronization barriers compatible with OpenMP tasking semantics, as further described in the co-pending U.S. patent application Ser. No. 14/568,831, entitled "Technologies for Efficient Synchronization Barriers with Work Stealing Support." After exiting the synchronization barrier, the method 300 loops back to block 302 to continue multithreaded execution and potentially entering another synchronization barrier.

Figure 3B:
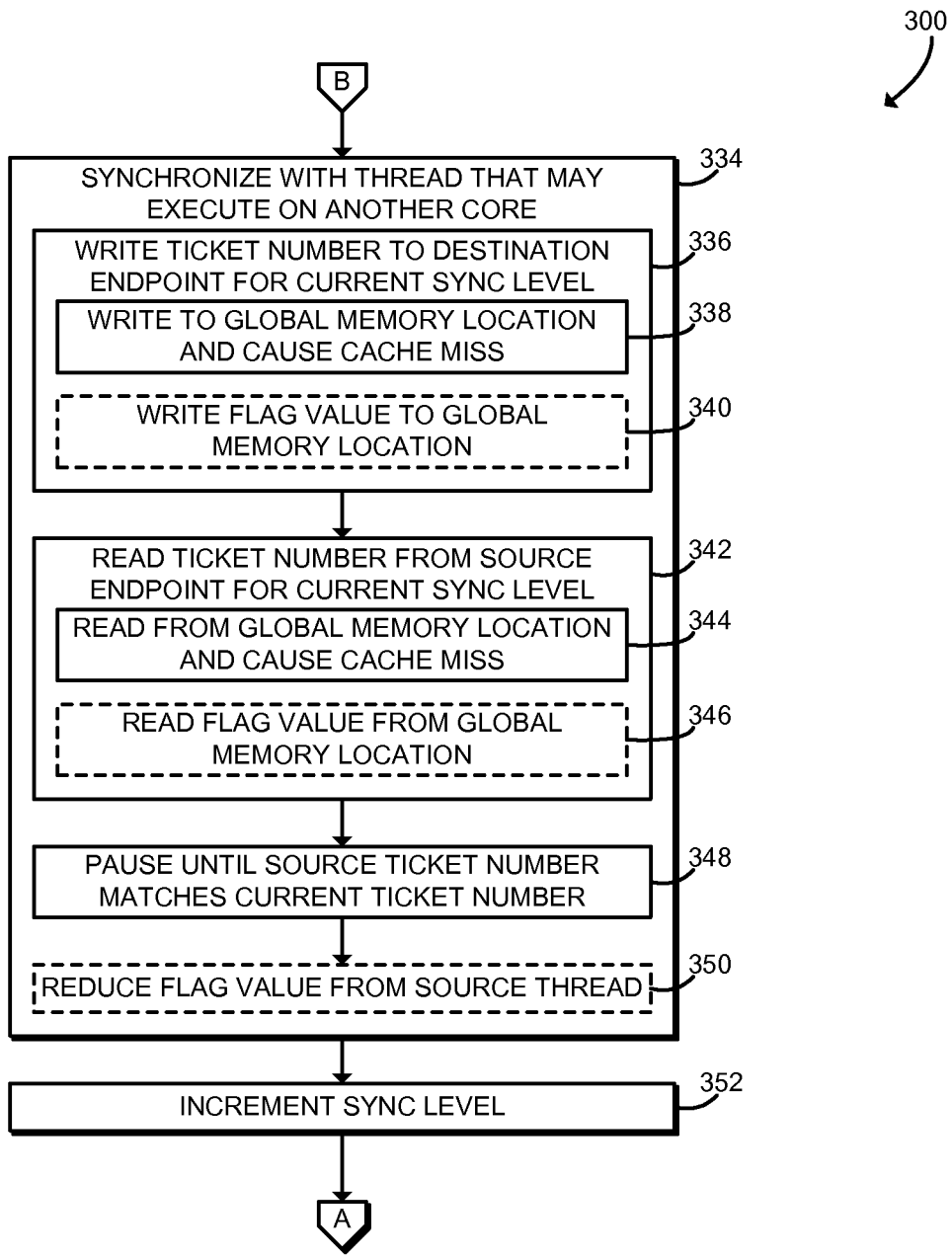

Referring back to block 328, if additional synchronization levels remain, the method 300 branches to block 334, shown in FIG. 3B. Referring now to FIG. 3B, in block 334 the hardware thread 124a, known as the destination hardware thread 124a, synchronizes with a hardware thread 124b, known as the source hardware thread 124b. As described above in connection with block 308, the destination hardware thread 124a and the source hardware thread 124b are usually (but not always) different hardware threads 124 executing on different processor cores 122 of the computing device 100. The destination hardware thread 124a may perform the synchronization by, for example, reading from and/or writing to a global memory structure in the system memory 128. The global memory structure may be stored, for example, in the global cache line area 212. Thus, the destination hardware thread 124a may incur one or more cache misses during synchronization with the source hardware thread 124b (e.g., a cache miss for writing and a cache miss for reading). However, the cache misses and associated latency may be incurred in parallel by all of the hardware threads 124 executing on the same processor core 122, which may reduce overall latency.

In block 336, the destination hardware thread 124a writes a ticket number to the destination endpoint. The hardware thread 124a may write the ticket number to a memory location, communication channel, or other field of the destination endpoint associated with the current synchronization level. The ticket number may be embodied as integer counter that is incremented by the hardware thread 124a in response to entering the synchronization barrier. In some embodiments, the ticket number may wrap around to zero after exceeding a threshold value, for example wrapping modulo 256. In block 338, the destination hardware thread 124a writes the ticket number to a global memory location in the system memory 128, which may cause a cache miss. For example, the destination hardware thread 124a may write to a destination endpoint field associated with the current synchronization level in the global cache line area 212 stored in the system memory 128, causing a cache miss. In some embodiments, in block 340, the hardware thread 124a may also write the flag parameter value to the global memory location. For example, the hardware thread 124a may encode the flag parameter value as a bit of the ticket number.

In block 342, the destination hardware thread 124a reads a ticket number from the source endpoint. The hardware thread 124a may read the ticket number from a memory location, communication channel, or other field of the source endpoint associated with the current synchronization level. As described above, the source endpoint is associated with the source hardware thread 124b, which may write or may have already written the ticket number to the source endpoint. In block 344, the destination hardware thread 124a reads the ticket number from a global memory location in the system memory 128, which may cause a cache miss. For example, the destination hardware thread 124a may read from a source endpoint field associated with the current synchronization level in the global cache line area 212 stored in the system memory 128, causing a cache miss. In some embodiments, in block 346, the hardware thread 124a may also read the flag parameter value from the global memory location. For example, the destination hardware thread 124a may decode a bit of the ticket number as the flag parameter value.

In block 348, the destination hardware thread 124a pauses until the source ticket number read from the source hardware thread 124b matches the current ticket number determined above in block 336. In other words, the destination hardware thread 124a waits until the source hardware thread 124b writes the same ticket number to the global memory structure. The destination hardware thread 124a may busy-wait, spin, yield, sleep, or perform any other appropriate technique to pause execution.

In some embodiments, in block 350 the destination hardware thread 124a may reduce the flag parameter value received from the source hardware thread 124b with its own flag parameter value. For example, the destination hardware thread 124a may perform a logical OR operation with the flag parameter values of the source hardware thread 124b and the destination hardware thread 124a. As described above in connection with block 324 of FIG. 3A, in subsequent iterations, the destination hardware thread 124a may reduce its own flag parameter value with the flag parameter values from each of the hardware threads 124 executed by the same processor core 122. Thus, flag parameter values may be propagated among hardware threads 124 executing on different processor cores 122.

In block 352, after the hardware thread 124a has synchronized with the source hardware thread 124b, the hardware thread 124a increments the synchronization level. As described above in connection with the blocks 326, 328, the synchronization level is used to determine whether the synchronization barrier is complete. Additionally, as described above in connection with blocks 336, 342, the synchronization level may also be used to identify memory locations, communication channels, or other locations to read and write data during remote synchronization. After incrementing the synchronization level, the method 300 loops back to block 314, shown in FIG. 3A, to synchronize with the hardware threads 124 executed by the same processor core 122. Thus, the computing device 100 may continue to alternately perform remote synchronization that may involve hardware threads 124 executing on different processor cores 122 and then perform local synchronization on each processor core 122.

Figure 5C:
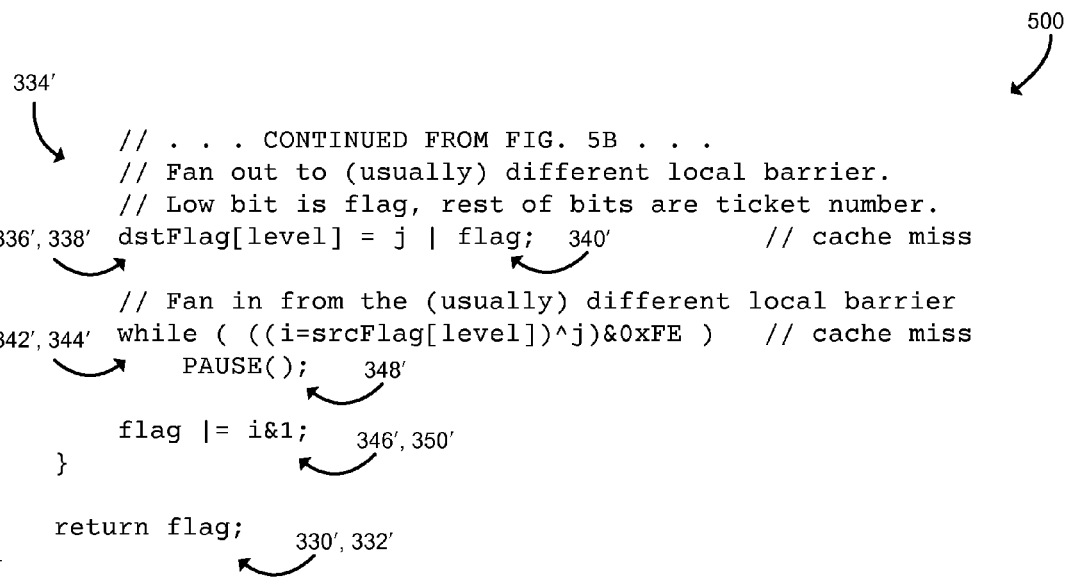

Referring now to FIGS. 5A-5C, the pseudocode 500 illustrates one potential embodiment of the method 300. As shown in FIG. 5A, the pseudocode 500 illustrates data structures 208', 212', 216' which each correspond to one illustrative embodiment of the local cache line area 208, global cache line area 212, and barrier network table 216 of FIG. 2, respectively. As shown in FIGS. 5B and 5C, the pseudocode 500 also illustrates operations 302' through 352', which each correspond to one illustrative embodiment of blocks 302 through 352 of FIGS. 3A and 3B, respectively. In particular, as shown in FIG. 5B, the pseudocode 500 synchronizes with other hardware threads 124 executing on the same processsor core 122 in the operation 314' by writing a sense value to a LocalCacheLine object shared with those other hardware threads 124 in the operation 316', 318' and then reading from that LocalCacheLine object in a tight loop until all of the sense values match in the operations 320', 322'. As shown, the pseudocode 500 reduces the flag parameter by performing a bitwise OR operation with the flag parameter and the sense value in the operation 318' and then testing the flag bits from the other processor cores 122 in the operation 324'.

As shown in FIG. 5C, the pseudocode 500 synchronizes with the source hardware thread 124b that may be executed by a different processor core 122 by writing the ticket number to the destination endpoint of a GlobalCacheLine object in the operation 336', 338' and then reading from the source endpoint of a GlobalCacheLine object in a tight loop until the source endpoint matches the ticket number in the operations 342', 344', 348'. Both the source and destination GlobalCacheLine objects are typically not in the local cache of the processor core 122 and thus reading and writing to those objects in the operations 336', 338' and 342', 344' each may cause a cache miss. As shown, the pseudocode 500 reduces the flag parameter by performing a bitwise OR operation with the flag parameter and the ticket value in the operation 340' and then extracting the flag value from the ticket read from the source endpoint and reducing that flag value with the flag parameter in the operation 346', 350'.

EXAMPLES

Illustrative examples of the technologies disclosed herein are provided below. An embodiment of the technologies may include any one or more, and any combination of, the examples described below.

Example 1 includes a computing device for multithreaded synchronization, the computing device comprising a thread management module to enter, by a first thread executed by a first processor core of the computing device, a synchronization barrier; a local barrier module to synchronize, by the first thread, with a first plurality of threads executed by the first processor core of the computing device in response to entering of the synchronization barrier; and a remote barrier module to synchronize, by the first thread, with a second thread executed by a second processor core of the computing device in response to synchronization with the first plurality of threads; wherein the local barrier module is further to re-synchronize, by the first thread, with the first plurality of threads in response to synchronization with the second thread.

Example 2 includes the subject matter of Example 1, and wherein the first processor core comprises a first predetermined number of subcores; and the first plurality of threads comprises the first predetermined number of threads.

Example 3 includes the subject matter of any of Examples 1 and 2, and further including a barrier network module to identify the second thread with an n-way perfect shuffle of a total number of threads to be executed by the computing device, wherein n equals the first predetermined number.

Example 4 includes the subject matter of any of Examples 1-3, and wherein the first predetermined number comprises four.

Example 5 includes the subject matter of any of Examples 1-4, and wherein the thread management module is further to exit, by the first thread, the synchronization barrier; and alternately repeat, by the first thread, synchronization with the second thread and re-synchronization with the first plurality of threads until an exit of the synchronization barrier.

Example 6 includes the subject matter of any of Examples 1-5, and wherein the first processor core comprises a first predetermined number of subcores; the first plurality of threads comprises the first predetermined number of threads; and to alternatively repeat synchronization with the second thread and re-synchronization with the first plurality of threads comprises to alternatively repeat a second predetermined number of times, wherein the second predetermined number is determined as a function of a third predetermined number of total threads to be executed by the computing device and the first predetermined number.

Example 7 includes the subject matter of any of Examples 1-6, and wherein the second predetermined number is determined as a ceiling function of a logarithmic function of the third predetermined number, wherein the logarithmic function uses the first predetermined number as the base.

Example 8 includes the subject matter of any of Examples 1-7, and wherein the first predetermined number is four, the second predetermined number is four, and the third predetermined number is 240.

Example 9 includes the subject matter of any of Examples 1-8, and wherein to synchronize with the first plurality of threads comprises to store a sense value in a memory structure shared by the first plurality of threads, wherein the sense value alternates between a first value and second value based on entry of the synchronization barrier; read a plurality of sense values from the memory structure shared by the first plurality of threads, wherein each of the plurality of sense values is stored by a corresponding thread of the plurality of threads; and pause execution of the first thread until the plurality of sense values match each other.

Example 10 includes the subject matter of any of Examples 1-9, and wherein the thread management module is further to alternate, by the first thread, the sense value between the first value and the second value in response to the entering of the synchronization barrier.

Example 11 includes the subject matter of any of Examples 1-10, and wherein to store the sense value comprises to store the sense value in a memory structure stored in a cache memory of the first processor core.

Example 12 includes the subject matter of any of Examples 1-11, and wherein to synchronize, by the first thread, with the second thread executed by the second processor core of the computing device comprises to store a first ticket number in a destination field of a global memory structure, wherein the destination field is associated with the first thread; read a second ticket number from a source field of the global memory structure, wherein the source field is associated with the second thread and the second ticket number is stored by the second thread; and pause execution of the first thread until the second ticket number matches the first ticket number.

Example 13 includes the subject matter of any of Examples 1-12, and wherein the global memory structure is stored in a main memory of the computing device.

Example 14 includes the subject matter of any of Examples 1-13, and wherein to store the first ticket number comprises to incur a cache miss; and to read the second ticket number comprises to incur a cache miss.

Example 15 includes the subject matter of any of Examples 1-14, and wherein the thread management module is further to alternate, by the first thread, an active communication channel between a first communication channel and a second communication channel in response to the entering of the synchronization barrier; wherein to store the first ticket number in the destination field comprises to store the first ticket number in the active communication channel of the destination field; and wherein to read the second ticket number from the source field comprises to read the second ticket number from the active communication channel of the source field.

Example 16 includes the subject matter of any of Examples 1-15, and wherein to enter the synchronization barrier comprises to enter the synchronization barrier with a flag parameter of the first thread; to synchronize with the first plurality of threads comprises to perform a logical-OR reduction operation on the flag parameter and a plurality of flag parameters corresponding with the first plurality of threads to generate a first reduction value; to synchronize with the second thread comprises to perform a logical-OR reduction operation on the first reduction value and a flag parameter corresponding with the second thread to generate a second reduction value; and to re-synchronize with the first plurality of threads comprises to perform a logical-OR reduction operation on the second reduction value and the plurality of flag parameters corresponding with the first plurality of threads to generate a third reduction value.

Example 17 includes the subject matter of any of Examples 1-16, and wherein to synchronize with the first plurality of threads further comprises to store the flag parameter value in a memory structure shared by the first plurality of threads.

Example 18 includes the subject matter of any of Examples 1-17, and wherein to synchronize, by the first thread, with the second thread executed by the second processor core of the computing device further comprises to store the first reduction value in a destination field of a global memory structure, wherein the destination field is associated with the first thread; and read the flag parameter corresponding with the second thread from a source field of the global memory structure, wherein the source field is associated with the second thread.

Example 19 includes a method for multithreaded synchronization, the method comprising entering, by a first thread executed by a first processor core of a computing device, a synchronization barrier; synchronizing, by the first thread, with a first plurality of threads executed by the first processor core of the computing device in response to entering the synchronization barrier; synchronizing, by the first thread, with a second thread executed by a second processor core of the computing device in response to synchronizing with the first plurality of threads; and re-synchronizing, by the first thread, with the first plurality of threads in response to synchronizing with the second thread.

Example 20 includes the subject matter of Example 19, and wherein the first processor core comprises a first predetermined number of subcores; and the first plurality of threads comprises the first predetermined number of threads.

Example 21 includes the subject matter of any of Examples 19 and 20, and wherein the second thread is identified using an n-way perfect shuffle of a total number of threads to be executed by the computing device, wherein n equals the first predetermined number.

Example 22 includes the subject matter of any of Examples 19-21, and wherein the first predetermined number comprises four.

Example 23 includes the subject matter of any of Examples 19-22, and further including exiting, by the first thread, the synchronization barrier; and alternately repeating, by the first thread, synchronizing with the second thread and re-synchronizing with the first plurality of threads until exiting the synchronization barrier.

Example 24 includes the subject matter of any of Examples 19-23, and wherein the first processor core comprises a first predetermined number of subcores; the first plurality of threads comprises the first predetermined number of threads; and alternatively repeating synchronizing with the second thread and re-synchronizing with the first plurality of threads comprises alternatively repeating a second predetermined number of times, wherein the second predetermined number is determined as a function of a third predetermined number of total threads to be executed by the computing device and the first predetermined number.

Example 25 includes the subject matter of any of Examples 19-24, and wherein the second predetermined number is determined as a ceiling function of a logarithmic function of the third predetermined number, wherein the logarithmic function uses the first predetermined number as the base.

Example 26 includes the subject matter of any of Examples 19-25, and wherein the first predetermined number is four, the second predetermined number is four, and the third predetermined number is 240.

Example 27 includes the subject matter of any of Examples 19-26, and wherein synchronizing with the first plurality of threads comprises storing a sense value in a memory structure shared by the first plurality of threads, wherein the sense value alternates between a first value and second value based on entry of the synchronization barrier; reading a plurality of sense values from the memory structure shared by the first plurality of threads, wherein each of the plurality of sense values is stored by a corresponding thread of the plurality of threads; and pausing execution of the first thread until the plurality of sense values match each other.

Example 28 includes the subject matter of any of Examples 19-27, and further including alternating, by the first thread, the sense value between the first value and the second value in response to entering the synchronization barrier.

Example 29 includes the subject matter of any of Examples 19-28, and wherein storing the sense value comprises storing the sense value in a memory structure stored in a cache memory of the first processor core.

Example 30 includes the subject matter of any of Examples 19-29, and wherein synchronizing, by the first thread, with the second thread executed by the second processor core of the computing device comprises storing a first ticket number in a destination field of a global memory structure, wherein the destination field is associated with the first thread; reading a second ticket number from a source field of the global memory structure, wherein the source field is associated with the second thread and the second ticket number is stored by the second thread; and pausing execution of the first thread until the second ticket number matches the first ticket number.

Example 31 includes the subject matter of any of Examples 19-30, and wherein the global memory structure is stored in a main memory of the computing device.

Example 32 includes the subject matter of any of Examples 19-31, and wherein storing the first ticket number comprises incurring a cache miss; and reading the second ticket number comprises incurring a cache miss.

Example 33 includes the subject matter of any of Examples 19-32, and further including alternating, by the first thread, an active communication channel between a first communication channel and a second communication channel in response to entering the synchronization barrier; wherein storing the first ticket number in the destination field comprises storing the first ticket number in the active communication channel of the destination field; and wherein reading the second ticket number from the source field comprises reading the second ticket number from the active communication channel of the source field.

Example 34 includes the subject matter of any of Examples 19-33, and wherein entering the synchronization barrier comprises entering the synchronization barrier with a flag parameter of the first thread; synchronizing with the first plurality of threads comprises performing a logical-OR reduction operation on the flag parameter and a plurality of flag parameters corresponding with the first plurality of threads to generate a first reduction value; synchronizing with the second thread comprises performing a logical-OR reduction operation on the first reduction value and a flag parameter corresponding with the second thread to generate a second reduction value; and re-synchronizing with the first plurality of threads comprises performing a logical-OR reduction operation on the second reduction value and the plurality of flag parameters corresponding with the first plurality of threads to generate a third reduction value.

Example 35 includes the subject matter of any of Examples 19-34, and wherein synchronizing with the first plurality of threads further comprises storing the flag parameter value in a memory structure shared by the first plurality of threads.

Example 36 includes the subject matter of any of Examples 19-35, and wherein synchronizing, by the first thread, with the second thread executed by the second processor core of the computing device further comprises storing the first reduction value in a destination field of a global memory structure, wherein the destination field is associated with the first thread; and reading the flag parameter corresponding with the second thread from a source field of the global memory structure, wherein the source field is associated with the second thread.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for multi-threaded synchronization, the computing device comprising means for entering, by a first thread executed by a first processor core of a computing device, a synchronization barrier; means for synchronizing, by the first thread, with a first plurality of threads executed by the first processor core of the computing device in response to entering the synchronization barrier; means for synchronizing, by the first thread, with a second thread executed by a second processor core of the computing device in response to synchronizing with the first plurality of threads; and means for re-synchronizing, by the first thread, with the first plurality of threads in response to synchronizing with the second thread.

Example 41 includes the subject matter of Example 40, and wherein the first processor core comprises a first predetermined number of subcores; and the first plurality of threads comprises the first predetermined number of threads.

Example 42 includes the subject matter of any of Examples 40 and 41, and wherein the second thread is identified using an n-way perfect shuffle of a total number of threads to be executed by the computing device, wherein n equals the first predetermined number.

Example 43 includes the subject matter of any of Examples 40-42, and wherein the first predetermined number comprises four.

Example 44 includes the subject matter of any of Examples 40-43, and further including means for exiting, by the first thread, the synchronization barrier; and means for alternately repeating, by the first thread, synchronizing with the second thread and re-synchronizing with the first plurality of threads until exiting the synchronization barrier.

Example 45 includes the subject matter of any of Examples 40-44, and wherein the first processor core comprises a first predetermined number of subcores; the first plurality of threads comprises the first predetermined number of threads; and the means for alternatively repeating synchronizing with the second thread and re-synchronizing with the first plurality of threads comprises means for alternatively repeating a second predetermined number of times, wherein the second predetermined number is determined as a function of a third predetermined number of total threads to be executed by the computing device and the first predetermined number.

Example 46 includes the subject matter of any of Examples 40-45, and wherein the second predetermined number is determined as a ceiling function of a logarithmic function of the third predetermined number, wherein the logarithmic function uses the first predetermined number as the base.

Example 47 includes the subject matter of any of Examples 40-46, and wherein the first predetermined number is four, the second predetermined number is four, and the third predetermined number is 240.

Example 48 includes the subject matter of any of Examples 40-47, and wherein the means for synchronizing with the first plurality of threads comprises means for storing a sense value in a memory structure shared by the first plurality of threads, wherein the sense value alternates between a first value and second value based on entry of the synchronization barrier; means for reading a plurality of sense values from the memory structure shared by the first plurality of threads, wherein each of the plurality of sense values is stored by a corresponding thread of the plurality of threads; and means for pausing execution of the first thread until the plurality of sense values match each other.

Example 49 includes the subject matter of any of Examples 40-48, and further including means for alternating, by the first thread, the sense value between the first value and the second value in response to entering the synchronization barrier.

Example 50 includes the subject matter of any of Examples 40-49, and wherein the means for storing the sense value comprises means for storing the sense value in a memory structure stored in a cache memory of the first processor core.

Example 51 includes the subject matter of any of Examples 40-50, and wherein the means for synchronizing, by the first thread, with the second thread executed by the second processor core of the computing device comprises means for storing a first ticket number in a destination field of a global memory structure, wherein the destination field is associated with the first thread; means for reading a second ticket number from a source field of the global memory structure, wherein the source field is associated with the second thread and the second ticket number is stored by the second thread; and means for pausing execution of the first thread until the second ticket number matches the first ticket number.

Example 52 includes the subject matter of any of Examples 40-51, and wherein the global memory structure is stored in a main memory of the computing device.

Example 53 includes the subject matter of any of Examples 40-52, and wherein the means for storing the first ticket number comprises means for incurring a cache miss; and the means for reading the second ticket number comprises means for incurring a cache miss.

Example 54 includes the subject matter of any of Examples 40-53, and further including means for alternating, by the first thread, an active communication channel between a first communication channel and a second communication channel in response to entering the synchronization barrier; wherein the means for storing the first ticket number in the destination field comprises means for storing the first ticket number in the active communication channel of the destination field; and wherein the means for reading the second ticket number from the source field comprises means for reading the second ticket number from the active communication channel of the source field.

Example 55 includes the subject matter of any of Examples 40-54, and wherein the means for entering the synchronization barrier comprises means for entering the synchronization barrier with a flag parameter of the first thread; the means for synchronizing with the first plurality of threads comprises means for performing a logical-OR reduction operation on the flag parameter and a plurality of flag parameters corresponding with the first plurality of threads to generate a first reduction value; the means for synchronizing with the second thread comprises means for performing a logical-OR reduction operation on the first reduction value and a flag parameter corresponding with the second thread to generate a second reduction value; and the means for re-synchronizing with the first plurality of threads comprises means for performing a logical-OR reduction operation on the second reduction value and the plurality of flag parameters corresponding with the first plurality of threads to generate a third reduction value.

Example 56 includes the subject matter of any of Examples 40-55, and wherein the means for synchronizing with the first plurality of threads further comprises means for storing the flag parameter value in a memory structure shared by the first plurality of threads.

Example 57 includes the subject matter of any of Examples 40-56, and wherein the means for synchronizing, by the first thread, with the second thread executed by the second processor core of the computing device further comprises means for storing the first reduction value in a destination field of a global memory structure, wherein the destination field is associated with the first thread; and means for reading the flag parameter corresponding with the second thread from a source field of the global memory structure, wherein the source field is associated with the second thread.

The invention claimed is:

1. A computing device for multithreaded synchronization, the computing device comprising:
a processor comprising a plurality of processor cores, wherein each processor core of the plurality of processor cores comprises a first predetermined number of subcores;
a thread management module to enter, by a first thread executed by a first processor core of the computing device, a synchronization barrier;
a local barrier module to synchronize, by the first thread, with a first plurality of threads executed by the first processor core of the computing device in response to entering of the synchronization barrier, wherein the first plurality of threads comprises the first predetermined number of threads;
a barrier network module to identify a second thread with an n-way perfect shuffle of a total number of threads to be executed by the computing device, wherein n equals the first predetermined number, and wherein to identify the second thread with the n-way perfect shuffle comprises to determine a thread identifier j of the second thread with the equation:

$$j = \left\lfloor \frac{N}{n} \right\rfloor \cdot \text{subcore}_k + \text{core}_k;$$

wherein N equals the total number of threads, subcore$_k$ equals a subcore identifier of the first thread, and core$_k$ equals a core identifier of the first thread; and
a remote barrier module to synchronize, by the first thread, with the second thread executed by a second processor core of the computing device in response to synchronization with the first plurality of threads and in response to identification of the second thread;
wherein the local barrier module is further to re-synchronize, by the first thread, with the first plurality of threads in response to synchronization with the second thread.

2. The computing device of claim 1, wherein the thread management module is further to:
exit, by the first thread, the synchronization barrier; and
alternately repeat, by the first thread, synchronization with the second thread and resynchronization with the first plurality of threads until an exit of the synchronization barrier.

3. The computing device of claim 2, wherein:
to alternatively repeat synchronization with the second thread and re-synchronization with the first plurality of threads comprises to alternatively repeat a second predetermined number of times, wherein the second predetermined number is determined as a function of a third predetermined number of total threads to be executed by the computing device and the first predetermined number.

4. The computing device of claim 3, wherein the second predetermined number is determined as a ceiling function of a logarithmic function of the third predetermined number, wherein the logarithmic function uses the first predetermined number as the base.

5. The computing device of claim 1, wherein to synchronize with the first plurality of threads comprises to:
store a sense value in a memory structure shared by the first plurality of threads, wherein the sense value alternates between a first value and second value based on entry of the synchronization barrier;
read a plurality of sense values from the memory structure shared by the first plurality of threads, wherein each of the plurality of sense values is stored by a corresponding thread of the plurality of threads; and
pause execution of the first thread until the plurality of sense values match each other.

6. The computing device of claim 1, wherein to synchronize, by the first thread, with the second thread executed by the second processor core of the computing device comprises to:
store a first ticket number in a destination field of a global memory structure, wherein the destination field is associated with the first thread;
read a second ticket number from a source field of the global memory structure, wherein the source field is associated with the second thread and the second ticket number is stored by the second thread; and
pause execution of the first thread until the second ticket number matches the first ticket number.

7. The computing device of claim 6, wherein the global memory structure is stored in a main memory of the computing device.

8. The computing device of claim 7, wherein:
to store the first ticket number comprises to incur a cache miss; and
to read the second ticket number comprises to incur a cache miss.

9. The computing device of claim 1, wherein:
to enter the synchronization barrier comprises to enter the synchronization barrier with a flag parameter of the first thread;
to synchronize with the first plurality of threads comprises to perform a logical-OR reduction operation on the flag parameter and a plurality of flag parameters corresponding with the first plurality of threads to generate a first reduction value;
to synchronize with the second thread comprises to perform a logical-OR reduction operation on the first reduction value and a flag parameter corresponding with the second thread to generate a second reduction value; and
to re-synchronize with the first plurality of threads comprises to perform a logical-OR reduction operation on the second reduction value and the plurality of flag parameters corresponding with the first plurality of threads to generate a third reduction value.

10. The computing device of claim 9, wherein to synchronize with the first plurality of threads further comprises to store the flag parameter value in a memory structure shared by the first plurality of threads.

11. The computing device of claim 9, wherein to synchronize, by the first thread, with the second thread executed by the second processor core of the computing device further comprises to:
store the first reduction value in a destination field of a global memory structure, wherein the destination field is associated with the first thread; and
read the flag parameter corresponding with the second thread from a source field of the global memory structure, wherein the source field is associated with the second thread.

12. A method for multithreaded synchronization, the method comprising:
entering, by a first thread executed by a first processor core of a computing device, a synchronization barrier, wherein the first processor core comprises a first predetermined number of subcores;
synchronizing, by the first thread, with a first plurality of threads executed by the first processor core of the computing device in response to entering the synchronization barrier, wherein the first plurality of threads comprises the first predetermined number of threads;
identifying, by the first thread, a second thread with an n-way perfect shuffle of a total number of threads to be executed by the computing device, wherein n equals the first predetermined number, and wherein to identify the second thread with the n-way perfect shuffle com rises to determine a thread identifier j of the second thread with the equation:

$$j = \left\lfloor \frac{N}{n} \right\rfloor \cdot \text{subcore}_k + \text{core}_k;$$

wherein N equals the total number of threads, subcore$_k$ equals a subcore identifier of the first thread, and core$_k$ equals a core identifier of the first thread;
synchronizing, by the first thread, with the second thread executed by a second processor core of the computing device in response to synchronizing with the first plurality of threads and in response to identifying the second thread; and
re-synchronizing, by the first thread, with the first plurality of threads in response to synchronizing with the second thread.

13. The method of claim 12, wherein synchronizing with the first plurality of threads comprises:
storing a sense value in a memory structure shared by the first plurality of threads, wherein the sense value alternates between a first value and second value based on entry of the synchronization barrier;
reading a plurality of sense values from the memory structure shared by the first plurality of threads, wherein each of the plurality of sense values is stored by a corresponding thread of the plurality of threads; and
pausing execution of the first thread until the plurality of sense values match each other.

14. The method of claim 12, wherein synchronizing, by the first thread, with the second thread executed by the second processor core of the computing device comprises:
storing a first ticket number in a destination field of a global memory structure, wherein the destination field is associated with the first thread;
reading a second ticket number from a source field of the global memory structure, wherein the source field is associated with the second thread and the second ticket number is stored by the second thread; and
pausing execution of the first thread until the second ticket number matches the first ticket number.

15. One or more non-transitory, computer-readable storage media comprising a plurality of instructions that in response to being executed cause a computing device to:
enter, by a first thread executed by a first processor core of the computing device, a synchronization barrier, wherein the first processor core comprises a first predetermined number of subcores;
synchronize, by the first thread, with a first plurality of threads executed by the first processor core of the computing device in response to entering the synchronization barrier, wherein the first plurality of threads comprises the first predetermined number of threads;
identify by the first thread, a second thread with an n-way perfect shuffle of a total number of threads to be executed by the computing device, wherein n equals the first predetermined number, and wherein to identify the second thread with the n-way perfect shuffle comprises to determine a thread identifier j of the second thread with the equation:

$$j = \left\lfloor \frac{N}{n} \right\rfloor \cdot \text{subcore}_k + \text{core}_k;$$

wherein N equals the total number of threads, subcore$_k$ equals a subcore identifier of the first thread, and core$_k$ equals a core identifier of the first thread;
synchronize, by the first thread, with the second thread executed by a second processor core of the computing device in response to synchronizing with the first plurality of threads and in response to identifying the second thread; and
re-synchronize, by the first thread, with the first plurality of threads in response to synchronizing with the second thread.

16. The one or more non-transitory, computer-readable storage media of claim 15, wherein to synchronize with the first plurality of threads comprises to:

store a sense value in a memory structure shared by the first plurality of threads, wherein the sense value alternates between a first value and second value based on entry of the synchronization barrier;

read a plurality of sense values from the memory structure shared by the first plurality of threads, wherein each of the plurality of sense values is stored by a corresponding thread of the plurality of threads; and pause execution of the first thread until the plurality of sense values match each other.

17. The one or more non-transitory, computer-readable storage media of claim 15, wherein to synchronize, by the first thread, with the second thread executed by the second processor core of the computing device comprises to:

store a first ticket number in a destination field of a global memory structure, wherein the destination field is associated with the first thread;

read a second ticket number from a source field of the global memory structure, wherein the source field is associated with the second thread and the second ticket number is stored by the second thread; and pause execution of the first thread until the second ticket number matches the first ticket number.

\* \* \* \* \*